United States Patent [19]

Crabb et al.

[11] 3,748,512

[45] July 24, 1973

[54] STATOR LEAD ANCHORING SLOT INSULATOR

[75] Inventors: William A. Crabb, Kent; James L. Flynn, Cleveland, both of Ohio

[73] Assignee: Ametek, Inc., New York, N.Y.

[22] Filed: Feb. 22, 1972

[21] Appl. No.: 228,093

[52] U.S. Cl. .................... 310/71, 310/194, 310/214, 310/215

[51] Int. Cl. .................... H02k 3/36

[58] Field of Search .................... 310/71, 194, 214, 310/215, 258, 260, 43; 336/185, 192

[56] References Cited

UNITED STATES PATENTS

| | | | |
|---|---|---|---|
| 2,631,251 | 3/1953 | Spielman | 310/215 |
| 3,161,796 | 12/1964 | Annis et al. | 310/214 X |
| 863,207 | 8/1907 | Olds | 310/71 |
| 3,443,136 | 5/1969 | Freeman et al. | 310/194 |
| 3,519,860 | 7/1970 | Stone | 310/71 |
| 3,609,427 | 9/1971 | Lautner | 310/194 |
| 2,872,599 | 2/1959 | De Young | 310/71 |
| 3,441,759 | 4/1969 | Watkins | 310/71 |
| 2,038,446 | 4/1936 | Redmond | 310/194 |

*Primary Examiner*—J. D. Miller
*Assistant Examiner*—Mark O. Budd
*Attorney*—Philip D. Golrick

[57] ABSTRACT

In an electric motor stator core slot insulating liner including a stator lead enclosing and anchoring channel structure on a liner outer side or panel having a liner retaining edge engagement with a slot outer wall terminating shoulder and the channel structure including a flap formed by a liner stock folded along said edge back upon itself, the improvement of a cut score in said edge on the outward side of the fold line region to provide a flat, squared shoulder engaging edge and a more easily produced initially flat-lying flap.

3 Claims, 3 Drawing Figures

16
10
18
12
14
15
17
24
13
23a
23
15
12
21
16
18
11
22
14

STATOR LEAD ANCHORING SLOT INSULATOR

The present invention is discussed in terms of a field or stator for a two pole fractional horsepower motor, but it is to be understood that the disclosed structure has wider application in wound electromagnet structures, especially motors, having coils wound into core slots.

In wound stator cores for electric motors, one or more coil magnet wire ends are spliced to respective heavier more thickly insulated flexible wire leads by which electrical connections are made externally or to other motor components. Generally it is necessary to insulate the lead-to-magnet wire splice; and further to anchor the lead to the core, not only to fix its location, but also for stress relief to avoid the possible splice damage by tension applied to the lead. To attain one or more of these objects, prior practices, with or without an insulating sleeve or tape on the splice, have involved, for example, merely clamping a part of the lead to the stator; or installing apertured insulating tabs or plates of various forms in or on the stator, as for example, a projecting apertured tab on a slot insulating liner, with the lead splice end region engaged frictionally or by knotting in the apertures. Also an insulated lead has been so held in a stator slot during coil winding that the lead is then in effect embedded and held in the slot by the finished wound coil.

To overcome various disadvantages of these and other prior practices — such as inconvenience entailed, or tooling required, in the winding procedures for holding a lead, expense of the lead anchoring element itself or its handling and fabrication, the necessity of applying special splice insulating means or certain limitations imposed on the lead insulation used to avoid damage to the embedded lead— in a stator or other core slot, at a point where a coil terminating lead is to be located, there may be provided a preformed and preferably self-retaining slot insulating liner, which may be comprised of conventional insulating sheet fiber stock, at least for its major structure; the liner having a channel or other formation extending longitudinally of the slot and adapted readily to receive and yet retain the lead wire with the lead end to be a spliced projecting endwise slightly therefrom. Then with the lead thus held in place the coil magnet wire can be wound onto the core in otherwise basically conventional manner, so that thereafter with each such projecting lead having a corresponding magnet wire and spliced thereto, the spliced end can be drawn into the channel, tightening up the end portion of the magent wire, and bringing the splice itself into an insulating location. Alternatively the lead can be emplaced in the channel after winding.

Where such lead anchoring liner takes a self-holding form, with an outer side or panel of the liner folded in a flap back upon itself along an edge which engages a narrow shoulder perpendicular to the slot outer wall by the resiliency of the liner to provide self-holding, after liner insertion until winding, the folded back flap forms part of anchoring channel forming structure.

The present invention improves this liner form by providing in fibrous paper liner stock an external cut score line at the folded edge location, that is on the side of the fold line away from which the fold is made. This affords the advantages that, in fabrication, folding is done more precisely and easily at the desired location to attain a good flat-lying flap disposition. Further in the shoulder engaging edge there is eliminated the roundness of a simple crease and a resultant approximate line contact with the shoulder, to afford rather a narrow flat edge which is less likely to escape from engagement with the narrow shoulder.

It is the general object of the present invention to provide an improved lead-anchoring self-holding slot liner structure for a dynamo-electric machine stator coil slot. Another object is to provide a lead-anchoring slot liner structure which is more readily fabricated. A still further object is to provide a slot liner which provides an improved engagement with a slot shoulder for liner self-retention prior to winding.

Other objects and advantages will appear from the following description and drawing wherein.

Figure 1:
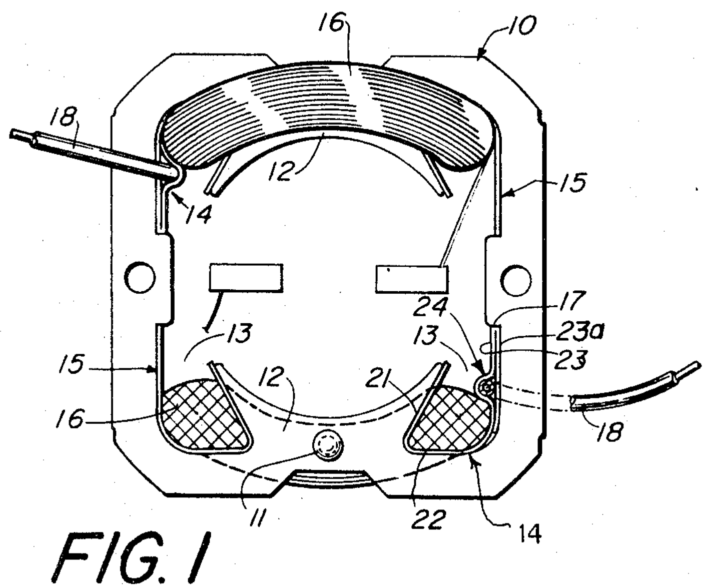
FIG. 1 is an axial end view of a wound motor core embodying structure of the invention, with certain portions broken away for clarity of representation.

In FIG. 1 of the drawings, the present invention is shown embodied in or as applied to self-holding lead anchoring slot insulators of a field or stator core of a two-pole fractional horsepower electric motor, in general conventional in structure.

The stator core 10, generally square in external outline, conventionally comprises a stack of like symmetric electromagnet iron laminations riveted into unit by longitudinal rivets 11; and has, diametrically located relative to a rotor or armature receiving space, two opposed arcuately faced poles 12, each defined by a respective pair of similarly shaped longitudinal, i.e., axially running, slots 13, lined with respective slot insulators 14–15; a coil 16 of magnet wire being wound into each respective pole-defining slot pair, about the pole neck. Midway between the adjacent slots of successive poles, on an inwardly projecting broad low rib or land, narrow opposed parallel sides define low longitudinal right angle shoulders 17 at each of which terminates the outer wall of the respective slot. In each magnet wire coil winding, one end is spliced and thus electrically connected to a heavier flexible wire lead 18, having a relatively thick layer of insulating plastic in modern practice; the other end being shown merely connected to a brush holder.

Each liner or slot insulator 14, 15 is preformed generally to the cross-section of, and to conform generally to the wall portions of, the slot with the end of outer side or panel of the liner (i.e., its longitudinal edge), at least initially as inserted, engaging a respective shoulder 17, under the resiliency of the liner material to provide a cooperative action retaining the liner from popping out or other undesirable displacement after insertion until winding, thus far being conventional. The liners 15, at which no leads 18 are anchored, can be totally conventional. The liners may project somewhat at each axial end of the slot in a usual fashion to provide additional end spacing of the windings from the core metal.

Each lead anchoring liner 14, as in the conventional elements 15, thus provides a straight or flat panel portion 21 against the flat inside slot wall and thereform curves around in liner bottom 22 conforming to the slot bottom to run up into a panel portion 23 extending out along a straight part of the slot outside wall toward the respective shoulder 17. However, in contrast with liners 15, at a location near the longitudinal slot mouth (when the liner 14 is in place), that is, about opposite the free longitudinal edge of the inside panel portion 21, the outer panel 23 has a longitudinally directed lead-receiving channel structure generally indicated 24 in which lodges the corresponding lead wire 18 in the finished core; the channel structure affording, as hereinafter described in detail, a lead anchoring and splice insulating environment. The slot insulating liners may be made of any conventional formable insulating fiber sheet such as heavy (e.g., 0.015 inch thick) rag paper stock hitherto commonly used for such purposes and with the "grain" running at right angles to the liner length.

Figure 2:
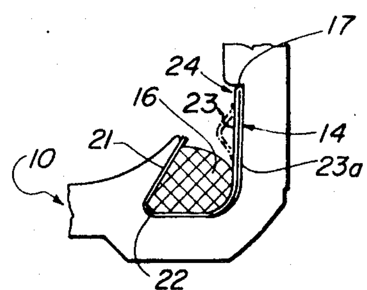
FIG. 2 is a fragmentary view corresponding to a portion of FIG. 1, but showing a before lead placement a liner structure of which this present invention represents an improvement.

In FIG. 1 as in FIG. 2 for which FIG. 1 represents the inventive improvement, at and along the entire longitudinal free edge of the liner outer panel 23, the sheet material of a liner 14 is reflected outwardly and backwardly upon itself in a backward fold **23*a* lying immediately against the outer wall, the two layers where 23*a* overlies 23 providing the material forming the lead receiving channel 24**. The flap may be large enough to extend into the rounding at the slot bottom.

Figure 3:
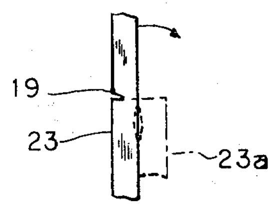
FIG. 3 is a fragmentary detail of the slot insulator structure.

Whereas the simple crease fold (as in FIG. 2) results in a rounded edge engaging a shoulder 17, by the improvement of the present invention, a cut score 19 to a depth of about half the stock thickness is provided (see FIG. 3) on that one side of the stock away from which the fold back is made, so that as the material in folding hinges about the residual material not penetrated by the cut score, the sides of the cut swinging away from each other form a squared rather flat-faced end or edge, in width about twice the thickness of the liner sheet stock thus being relatively broad for shoulder contact as compared to FIG. 2. A more effective engagement of the shoulder by the liner is obtained, less likely to slip off than the rounded edge, for providing self-holding, i.e., without need of adhesive or fastening means to secure the liner. Further the flap is more readily folded to a flat disposition.

The improvement above described is useful whether the channel structure 24 is provided by a flat region of the main part of outer panel 23 overlain by a large flap **23*a* as in FIG. 2, in spreadable layers conveniently allowing insertion of a lead, even after winding with an insertion guide tool; or where also the outer panel 23 is preformed with an inwardly deformed round -bottomed, trough-formation at 24, running the entire length, thus transverse to the fiber grain; with the longitudinal flap 23*a*** in either case closing the ultimate trough longitudinally into what may be termed a tubular receiving channel.

Thus the splice end of a lead 18 may be pushed through, and positioned to project from, such channel of an insulator liner 14 located in its slots.

As the stator stack in fabricating operations proceeds to the winding operation, the appropriate slot liners are emplaced; each lead wire 18 at this point can be inserted into the liner channel formation at its respective position with its splicing end projecting somewhat from one channel end; the ends of the lead wires being bent out of the way as might be necessary for the winding equipment; and the windings are then applied, in usual fashion.

After the coil winding operation is completed, the appropriate splices of the coil magnet wire ends are made to respective leads; and the spliced ends are drawn into the channels by pulling on the longer free opposite ends thereby bringing each splice into the respective channel formation as an insulating tube, which serves both to insulate the splice as well as anchoring means for the lead end. Thereby at the same time, with an appropriately made splice with not too much "slack" in the adjacent magnet wire end portion, the latter may be drawn down into snug position on the winding. The splice as such, that is the physical and electrical connection of the magnet wire to the lead end is made in any suitable manner; for example by soldering, or by use of a crimped-on connector.

The lead anchoring structure here disclosed is useful where it is desired to insert the lead wires after winding is completed, though before impregnation; in which case, the lead may be spliced either before or, as above, after insertion. With after-winding insertion, a guide and/or feed tool passed between the folded over part and the main part of the liner may be used to assist the lead insertion, with local bowing as dot-dashed in FIG. 2.

In addition to friction engagement developed between lead and liner especially under coil pressure, adequately to secure the lead and take up any strain that might reasonably be expected to be applied to the lead, thus protecting the splice, obviously subsequent core impregnating with an insulating varnish, can contribute greatly.

We claim:

1. In a slot liner for an electric motor having an iron core with at least one mouthed slot, a wire coil wound on said core and into said slot, a lead element spliced to one end of the coil wire, and a slot liner of insulating sheet-like material interposed in said slot between the coil wire and the walls of said slot, said liner preformed to have an inner panel, an outer panel and a portion joining said panels generally to conform respectively to an inner, an outer and a joining wall surface of the slot, said outer panel having an outer edge extending longitudinally of the slot direction and having a flap bent back upon the outer panel from and along a fold line at said edge and adapted to form a channel receiving and anchoring a portion of the length of a said lead element at the splicing end to be retained therein;

said outer edge, upon initial liner insertion for liner self-retention, engaging a low shoulder terminating said outer wall surface of the slot;

the improvement comprising: a longitudinal external cut score interruption of the liner stock continuity along said fold line thereby, at said longitudinally extending outer edge, providing a generally transversely flat longitudinal edge face for engaging said shoulder and a flat disposition of the flap on the outer panel.

2. The improvement as described in claim 1, wherein said lead element is frictionally engaged and retained in said channel, to provide strain relief for a splice between the lead and magnet wire, by pressure of the coil wire wound into said slot and communicated to the material of the channel.

3. The improvement as described in claim 1, wherein core structure impregnating varnish affords a bonding between said lead element and said channel to provide strain relief for a splice between the lead and magnet wire.

* * * * *